(12) United States Patent
Yamamoto et al.

(10) Patent No.: US 7,617,025 B2
(45) Date of Patent: Nov. 10, 2009

(54) ELECTRIC OIL PUMP CONTROL SYSTEM IN HYBRID VEHICLE

(75) Inventors: Akihiro Yamamoto, Utsunomiya (JP); Kazuhisa Yamamoto, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 553 days.

(21) Appl. No.: 11/340,470

(22) Filed: Jan. 27, 2006

(65) Prior Publication Data
US 2006/0190145 A1 Aug. 24, 2006

(30) Foreign Application Priority Data
Feb. 18, 2005 (JP) .............................. 2005-042070

(51) Int. Cl.
*G06F 7/70* (2006.01)
(52) U.S. Cl. ...................... 701/14; 701/22; 701/103; 701/104; 180/65.1; 180/65.21
(58) Field of Classification Search ............... 701/14, 701/22, 51, 69, 101, 103, 104, 112; 180/65.1, 180/65.3, 69.4, 65.21
See application file for complete search history.

(56) References Cited

U.S. PATENT DOCUMENTS

| | | | |
|---|---|---|---|
| 6,401,012 B1 | 6/2002 | Aoki et al. | |
| 6,769,502 B2 * | 8/2004 | Nakamori et al. | 180/65.2 |
| 2004/0029677 A1 | 2/2004 | Mori et al. | |

FOREIGN PATENT DOCUMENTS

| | | |
|---|---|---|
| JP | 2001-41067 A | 2/2001 |
| JP | 2001-208177 A | 8/2001 |
| JP | 2003-172165 A | 6/2003 |
| JP | 2003-240110 | 8/2003 |
| JP | 2003-240110 A | 8/2003 |
| JP | 2004-156774 A | 6/2004 |
| JP | 2005-207303 | 8/2005 |
| JP | 2005-289316 | 10/2005 |
| JP | 2006-170265 | 6/2006 |
| JP | 2006-226381 | 8/2006 |

* cited by examiner

*Primary Examiner*—Gertrude Arthur Jeanglaud
(74) *Attorney, Agent, or Firm*—Arent Fox LLP (57) ABSTRACT

An electric oil pump control system for a hybrid vehicle which has an engine and a first electric motor as driving sources; a hydraulic automatic transmission connected between the engine and drive wheels of the vehicle; an electric oil pump for generating an oil pressure necessary for performing gear change of the transmission. The hybrid vehicle can run by at least one of the engine and the first electric motor in accordance with a driving state of the vehicle. The control system has a control device for driving the electric oil pump so as to generate an oil pressure supplied to the hydraulic automatic transmission, wherein the control device drives the electric oil pump when the hybrid vehicle runs with the engine and the electric oil pump which are stopped, in accordance with a predetermined condition by which it is determined that the electric oil pump should be driven.

7 Claims, 10 Drawing Sheets

ELECTRIC OIL PUMP CONTROL SYSTEM IN HYBRID VEHICLE

BACKGROUND OF THE INVENTION

1. Field of the Invention

The present invention relates to an electric oil pump control system applied to a hybrid vehicle which has an engine, a traction motor, and a generator motor and can run by a driving force generated only by the traction motor or a driving force generated by the engine.

Priority is claimed on Japanese Patent Application No. 2005-042070, filed Feb. 18, 2005, the content of which is incorporated herein by reference.

2. Description of the Related Art

A hybrid vehicle has an engine and an electric motor as generators of a driving force. Recently, a new type hybrid vehicle has been proposed which has an electric oil pump for providing an oil pressure to the transmission necessary when the driving mode of the vehicle is switched from an engine-stop running mode to an engine-driving running mode.

For example, Japanese Unexamined Patent Application, First Publication No. 2003-240110 discloses a technique in which in a hybrid vehicle having a structure similar to the above, when the running vehicle is electrically driven by an axle-driving motor, the electric oil pump is driven and an oil pressure is applied to an oil-pressure control system so as to secure an oil pressure to the transmission in preparation for switching to the engine-driving running mode and to reduce a so-called ineffective stroke of engaged elements of the transmission, thereby quickly engaging relevant elements of the transmission and smoothly switching to the engine-driving running mode.

However, in the above conventional technique, the electric oil pump is continuously driven until the electric running using the motor is stopped, which is not preferable in consideration of electric power consumption. This situation also degrades vehicle driving efficiency, which is not preferable in consideration of fuel consumption.

In addition, when the electric running using the motor is continued for a long time, the electric oil pump must also be continuously driven for a long time, which may considerably degrade the durability of the electric oil pump. In order to solve this problem, the electric oil pump is required to have a cooling performance or function endurable to such a continuous operation, and a design in consideration of the cooling performance is required, thereby increasing the price of the vehicle.

SUMMARY OF THE INVENTION

In light of the above circumstances, an object of the present invention is to provide an electric oil pump control system for reducing electric power consumption, fuel consumption, and durability required of the electric oil pump, and enabling quick switching to engine-driving running.

Therefore, the present invention provides an electric oil pump control system for a hybrid vehicle, wherein:

the hybrid vehicle has:

an engine (e.g., an engine E in an embodiment explained later) and a first electric motor (e.g., a motor M1 or M3 in the embodiment) as driving sources of the hybrid vehicle;

a hydraulic automatic transmission (e.g., a transmission T in the embodiment) connected between the engine and drive wheels of the hybrid vehicle;

an electric oil pump (e.g., an electric oil pump 22 in the embodiment) for generating an oil pressure necessary for performing gear change of the hydraulic automatic transmission, wherein the hybrid vehicle can run by at least one of the engine and the first electric motor in accordance with a driving state of the vehicle; and the control system has a control device for driving the electric oil pump so as to generate an oil pressure supplied to the hydraulic automatic transmission, wherein the control device drives the electric oil pump when the hybrid vehicle runs with the engine and the electric oil pump which are stopped, in accordance with a predetermined condition by which it is determined that the electric oil pump should be driven.

In accordance with the above structure, when the hybrid vehicle runs with the engine stopped and the predetermined condition is satisfied, the electric oil pump is driven. Therefore, even when running with the stopped engine (e.g., in an EV running mode or a regeneration running mode in the embodiment) continues for a long time, it is possible to prevent unnecessary driving of the electric oil pump and to prevent an increase in power or fuel consumption. It is also possible to reduce the durability required of the electric oil pump, thereby reducing the cost necessary for designing relevant parts. In addition, the electric oil pump is driven after the predetermined condition is satisfied; thus, the running mode can be smoothly switched to running with the driven engine, thereby improving driving performance (i.e., driveability).

In a typical example, it is determined that the electric oil pump should be driven when at least one of the following conditions is satisfied as the predetermined condition:

speed of the vehicle exceeds a predetermined value;

driving force by the first electric motor exceeds a predetermined value;

power output from the first electric motor exceeds a predetermined value;

a rate of temporal change in a degree of depression of an accelerator pedal of the vehicle exceeds a predetermined value; and the degree of depression of the accelerator pedal exceeds a predetermined value.

When employing a condition that the vehicle speed exceeds a predetermined value so as to start driving of the electric oil pump, the vehicle can run with the stopped engine until the vehicle speed exceeds the predetermined value, thereby improving vehicle driving efficiency.

When employing a condition that the driving force by the first electric motor exceeds a predetermined value so as to start driving of the electric oil pump, the vehicle can run with the stopped engine until the driving force by the first electric motor exceeds the predetermined value, thereby improving vehicle driving efficiency.

When employing a condition that power output from the first electric motor exceeds a predetermined value so as to start driving of the electric oil pump, the vehicle can run with the stopped engine until the power output from the first electric motor exceeds the predetermined value, thereby improving vehicle driving efficiency.

Regarding a condition that a rate of temporal change in a degree of depression of an accelerator pedal of the vehicle exceeds a predetermined value so as to start driving of the electric oil pump, when a great driving force is required so that the rate of temporal change in the degree of depression of the accelerator pedal exceeds the predetermined value, it is possible to smoothly switch to an engine running mode and improve vehicle driving efficiency.

Regarding a condition that the degree of depression of the accelerator pedal exceeds a predetermined value so as to start driving of the electric oil pump, when a great driving force is required so that the degree of depression exceeds the predetermined value, it is possible to smoothly switch to an engine running mode and improve vehicle driving efficiency.

Therefore, it is possible to improve driving performance.

Typically, the engine drives one of front wheels and rear wheels of the vehicle, and the first electric motor drives the other one of the front wheels and the rear wheels. In this case, in accordance with the driving state of the vehicle, it is possible to effectively and appropriately use the first electric motor and the engine, thereby reducing fuel consumption or an amount of exhaust gas.

In a typical example:
the hybrid vehicle further comprises:
a second electric motor (e.g., a motor M2 in the embodiment) connected to an output shaft of the engine; and
an engine stop selecting section for selecting one of a first stop state (e.g., an engine-stop EV running mode in the embodiment) and a second stop state (e.g., an idle-stop EV running mode in the embodiment) of the engine in accordance with the driving state of the vehicle while the vehicle runs using the first electric motor, wherein in the first stop state, rotation of the engine is mechanically stopped, and in the second stop state, the engine is rotated by the second electric motor at a predetermined engine speed without generating a driving force;
the control device includes an oil pressure control section (e.g., an electric oil pump driving control section 61 in the embodiment) for controlling the oil pressure supplied from the electric oil pump to the hydraulic automatic transmission, in accordance with the stop state of the engine selected by the engine stop selecting section; and
while the vehicle runs using the first electric motor:
when the first stop state is selected by the engine stop selecting section, driving of the electric oil pump is stopped, and
when the second stop state is selected by the engine stop selecting section, driving of the electric oil pump is controlled by the oil pressure control section so as to supply the oil pressure to the hydraulic automatic transmission in accordance with a required gear ratio.

In this case, while the vehicle runs using the first electric motor, when the running mode of the vehicle is switched from running with the stopped engine to running with the driven engine, the stop state of the engine is generally switched from the first stop state to the second stop state by the engine stop selecting section except for a rare case such as sudden acceleration; thus, driving of the electric oil pump is stopped in the first stop state, thereby preventing unnecessary driving of the electric oil pump. It is also prevent the electric oil pump being driven by an unnecessarily high amount of driving force, thereby improving power or fuel consumption and vehicle driving efficiency.

In this case, preferably:
the hybrid vehicle further comprises a mechanical oil pump driven by the engine; and
in the second stop state, the electric oil pump is stopped, and the oil pressure supplied to the hydraulic automatic transmission is generated using the mechanical oil pump.

Accordingly, in the second stop state in which the engine is rotated by the second electric motor at the predetermined engine speed, the mechanical oil pump can be driven by the engine. Therefore, when the electric oil pump is stopped, it is possible to improve power or fuel consumption and vehicle driving efficiency.

Also in the above case, preferably, the oil pressure in accordance with the required gear ratio is an oil pressure by which an ineffective stroke of engaged elements of the hydraulic automatic transmission is reduced so that no driving force is transmitted between the hydraulic automatic transmission and the drive wheels. Accordingly, a time lag from starting of the engine to actual output of driving force can be reduced; thus, the vehicle can be accelerated while the driver does not feel uncomfortable.

In this case, preferably, driving of the electric oil pump is controlled by the oil pressure control section in accordance with an oil pressure obtained by adding an oil pressure necessary for lubricating another driving system of the hybrid vehicle to the oil pressure by which the ineffective stroke is reduced. Accordingly, the time lag from starting of the engine to actual output of driving force can be further reduced; thus, the vehicle can be accelerated while the driver does not feel uncomfortable.

In a typical example, while the above first stop state is selected by the engine stop selecting section, in accordance with the driving state of the vehicle, the electric oil pump is driven and controlled by the oil pressure control section so as to supply the oil pressure to the hydraulic automatic transmission in accordance with the required gear ratio. In this case, when the engine is driven from the first stop state, the oil pressure in accordance with the required gear ratio can be supplied to the hydraulic automatic transmission. Therefore, electric running of the hybrid vehicle is possible using less electric power while securing required starting performance of the engine, thereby contributing to improvement of vehicle driving efficiency.

DETAILED DESCRIPTION OF THE INVENTION

Hereinafter, an automatic transmission of a hybrid vehicle to which an embodiment according to the present invention is applied will be described with reference to the appended figures.

Figure 1:
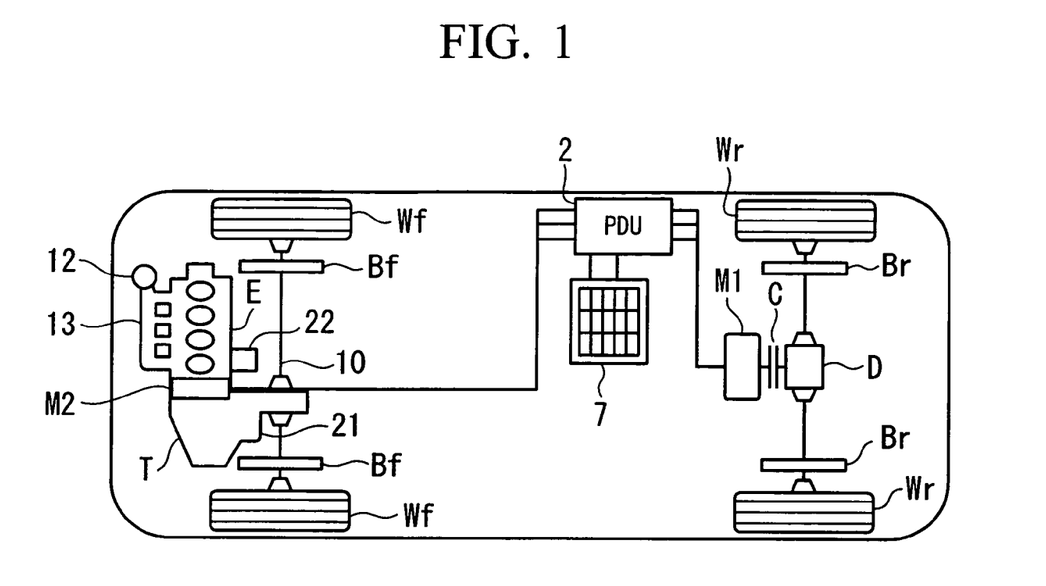
FIG. 1 is a diagram showing the general structure of a four-wheel drive hybrid vehicle to which the present invention can be applied.

FIG. 1 is a diagram showing the general structure of a four-wheel drive hybrid vehicle to which the present embodiment is applied. On the front side of the vehicle, an engine E and a motor M2 are provided, and on the rear side, a motor M1 is provided which may be connected to an input side of a differential gear D. In the present embodiment, the motor M1 on the rear side mainly functions as a traction motor, and the motor M2 on the front side mainly functions as a generator. Therefore, the motors M1 and M2 may be respectively called "a traction motor M1" and "a generator motor M2".

The motor M2 is positioned between the engine E and a transmission T (which may be an automatic transmission) having a gear change clutch. This clutch, provided at an end of the transmission T toward the motor M2, performs mechanical connection and disconnection of a driving force output from the engine E and the motor M2. In order to apply a working pressure to this clutch, a mechanical oil pump 21 is provided, which is operated by the generator motor M2 via the engine E. An electric oil pump (EOP) 22 is also provided, which is operated by supplying electric power to the electric oil pump 22 from a battery 7.

Between the motor M1 and the differential gear D, a start clutch C (or a motor clutch) is provided, which performs mechanical connection and disconnection of a driving force output from the motor M1. Accordingly, power output from the engine E and the motor M2 on the front side is transmitted via the transmission T to front wheels Wf, and power output from the motor M1 on the rear side is transmitted via the clutch C and the differential gear D to rear wheels Wr.

The motor M1 is controlled by a power drive unit (PDU) 2 based on a control command received from a traction motor ECU (TrMOT ECU (electrical control unit)) 40 (see FIG. 5) as a motor control device. Similarly, the motor M2 is controlled by the power drive unit 2 based on a control command received from a generator motor ECU (MOT/GEN ECU) 41 (see FIG. 5) as a motor control device.

To the power drive unit 2, a high-voltage nickel-hydrogen battery 7 is connected so as to supply and receive electric power to and from each of the motors M1 and M2. To this battery 7, an auxiliary battery for operating various accessories is connected via a downverter which is a DC-DC converter.

Each front wheel Wf, driven by the engine E and the motor M2, has a front wheel brake Bf, and each rear wheel Wr, driven by the motor M1, has a rear wheel brake Br.

The engine E is an in-line four-cylinder engine and has an inlet pipe 13 at which an electrically-controlled throttle 12 is provided. The throttle 12 is controlled by an engine ECU (FI ECU) 42 (see FIG. 5). An accelerator opening degree sensor (not shown) for measuring a degree of depression of an accelerator pedal (AP: not shown) is connected to the engine ECU 42.

The engine ECU 42 computes an amount of fuel injection according to the degree of depression of the accelerator pedal, or the like, and outputs a control signal relating to the amount of fuel injection to the electrically-controlled throttle 12.

Figure 2:
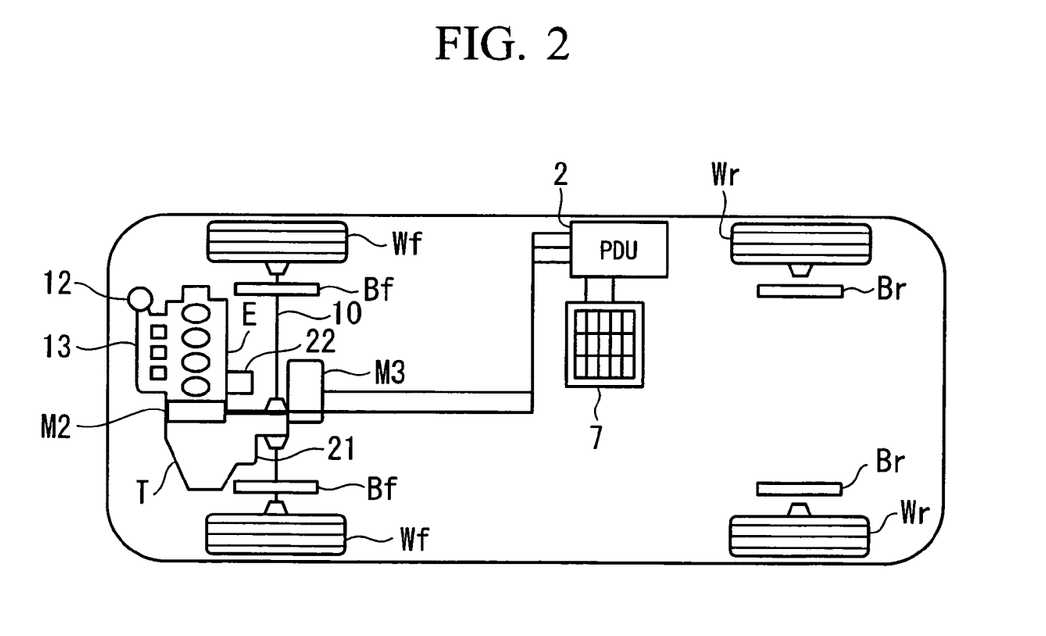
FIG. 2 is a diagram showing the general structure of a two-wheel drive hybrid vehicle to which the present invention can be applied.

FIG. 2 is a diagram showing the general structure of another hybrid vehicle to which the present invention can be applied. The shown hybrid vehicle is a two-wheel drive vehicle and has a traction motor M3 and a generator motor M2 on the front side of the vehicle, and thus has a structure different from the vehicle shown in FIG. 1.

The traction motor M3 can be connected and disconnected to and from an output shaft by a gear change clutch (not shown).

Figure 3:
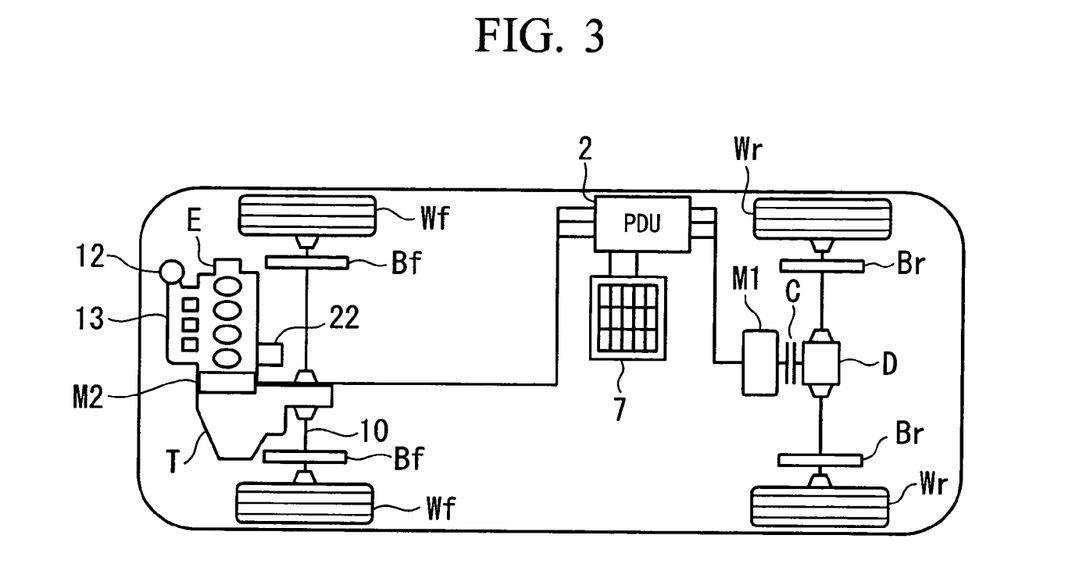
FIG. 3 is a diagram showing the general structure of a four-wheel drive hybrid vehicle to which the present invention can be applied.

FIG. 3 is a diagram showing the general structure of another hybrid vehicle to which the present invention can be applied. The shown hybrid vehicle is a four-wheel drive vehicle as in FIG. 1 but has a different structure in which only an electric oil pump 22 is used for operating the gear change clutch of the transmission T. The electric oil pump 22 is operated by supplying electric power to the electric oil pump 22 from the battery 7.

Figure 4:
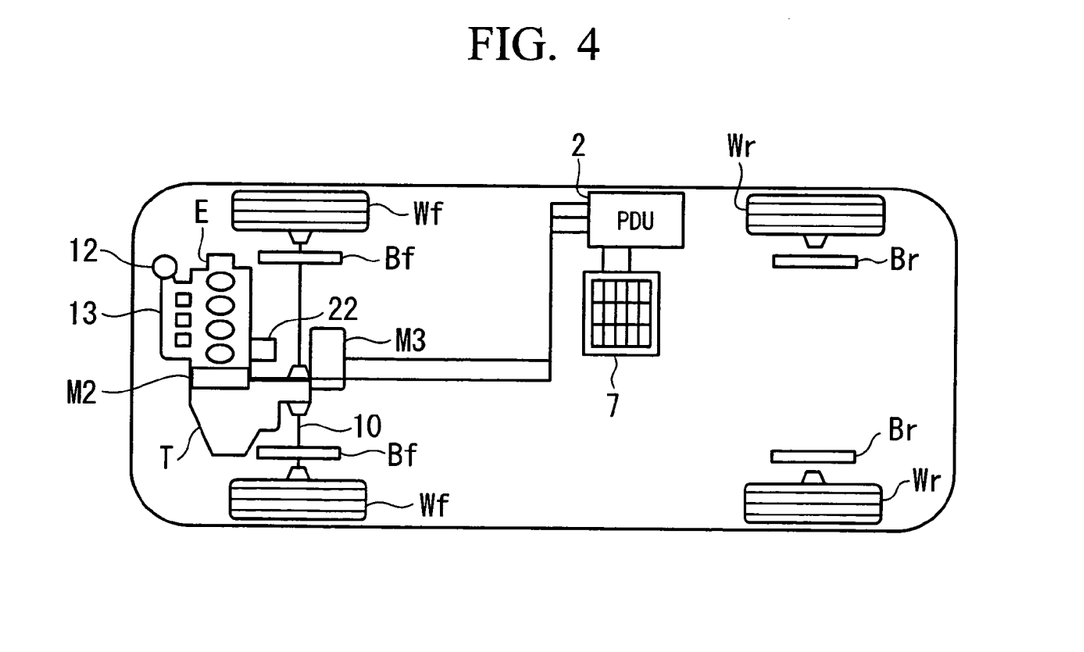
FIG. 4 is a diagram showing the general structure of a two-wheel drive hybrid vehicle to which the present invention can be applied.

FIG. 4 is a diagram showing the general structure of another hybrid vehicle to which the present invention can be applied. The shown hybrid vehicle is a two-wheel drive vehicle as in FIG. 2 but has a different structure in which only the electric oil pump 22 is used for operating the gear change clutch of the transmission T, as in the structure shown in FIG. 3.

Each hybrid vehicle shown in FIGS. 1 to 4 has an EV running mode in which the vehicle can run only by the traction motor M1 or M3 and an engine running mode in which at least the engine E is driven while the vehicle runs. The engine running mode includes a first mode in which the vehicle runs only by driving the engine E and a second mode in which the vehicle runs by driving the engine E and the motor M1 or M3. The first and the second modes are collectively called the engine running mode. Additionally, the EV running mode includes an engine-stop EV running mode in which rotation of the engine E is mechanically stopped, and an idle-stop EV running mode in which the engine E is rotated by the motor M2 at a specific engine speed (e.g., an idle engine speed) without making the engine E generate a driving force.

Figure 5:
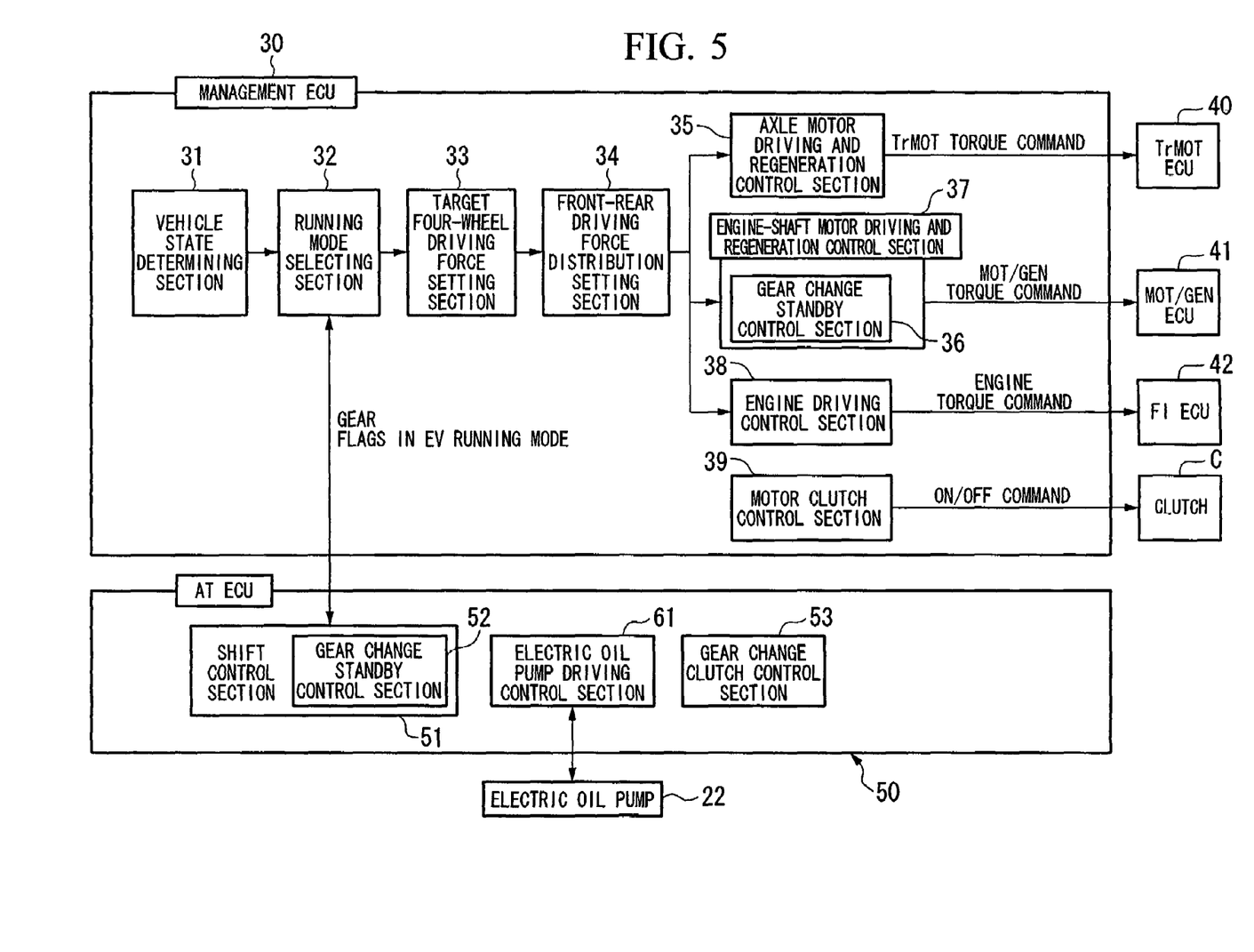
FIG. 5 is a block diagram showing ECUs (electrical control units) provided in each hybrid vehicle shown in FIGS. 1 to 4.

FIG. 5 is a block diagram showing ECUs (electrical control units) provided in each hybrid vehicle shown in FIGS. 1 to 4. As shown in FIG. 5, the hybrid vehicle has a management ECU 30 for controlling the entire vehicle, the above-described traction motor ECU (TrMOT ECU) 40 for controlling the traction motor M1 or M3 which drives the relevant wheels, the above-described generator motor ECU (MOT/GEN ECU) 41 for controlling the generator motor M2, the above-described engine ECU (FI ECU) 42 for controlling the engine E, the above-described clutch C, and an AT ECU 50 for controlling the transmission T.

In the management ECU 30, first, a vehicle state determining section 31 determines a vehicle state based on data from various sensors for measuring the degree of depression of the accelerator pedal, the amount of power in the battery 7 remaining, or the like. According to the determined vehicle state, a running mode selecting section 32 selects a running mode of the vehicle (i.e., the EV running mode, the engine running mode, or the like).

Next, a target four-wheel driving force setting section 33 sets a target driving force necessary to the vehicle, and a front-rear driving force distribution setting section 34 distributes the driving force to the front wheels Wf and the rear wheels Wr depending on the running mode.

According to the above distribution, control operation is performed as follows.

When driving or regeneration control of the vehicle is performed using the traction motor M1, an axle motor driving and regeneration control section 35 outputs a TrMOT torque command to the TrMOT ECU 40 so as to control the traction motor M1.

When driving or regeneration control of the vehicle is performed using the engine-shaft motor (i.e., the generator motor) M2, an engine-shaft motor driving and regeneration control section 37 outputs a MOT/GEN torque command to the MOT/GEN ECU 41 so as to control the generator motor M2.

In addition, a MOT/GEN torque command for reducing an ineffective stroke is output to the MOT/GEN ECU 41 in a control performed by a gear change standby control section 36 in the engine-shaft motor driving and regeneration control section 37 so as to control the generator motor M2 when the vehicle is in the EV running mode and it is determined that such a control is necessary (this determination will be explained later in detail).

When the engine E is driven, an engine driving control section 38 outputs an engine torque command to the FI ECU 42 so as to control the engine E.

When the motor clutch C (i.e., the start clutch) should be controlled, a motor clutch control section 39 sends an ON/OFF signal to the clutch C.

The AT ECU 50 will be explained below. The AT ECU 50 has a shift control section 51 connected to the running mode selecting section 32 in the management ECU 30 so that the gear and the flags which are referred to in the EV running mode can be communicated between the connected sections. A gear change standby control section 52 performs a gear change standby control when it is determined such a control is necessary based on the communicated data. The AT ECU 50 also has an electric oil pump driving control section 61 for controlling the electric oil pump 22, and a gear change clutch control section 53 for controlling the gear change clutch of the transmission T.

Figure 6:
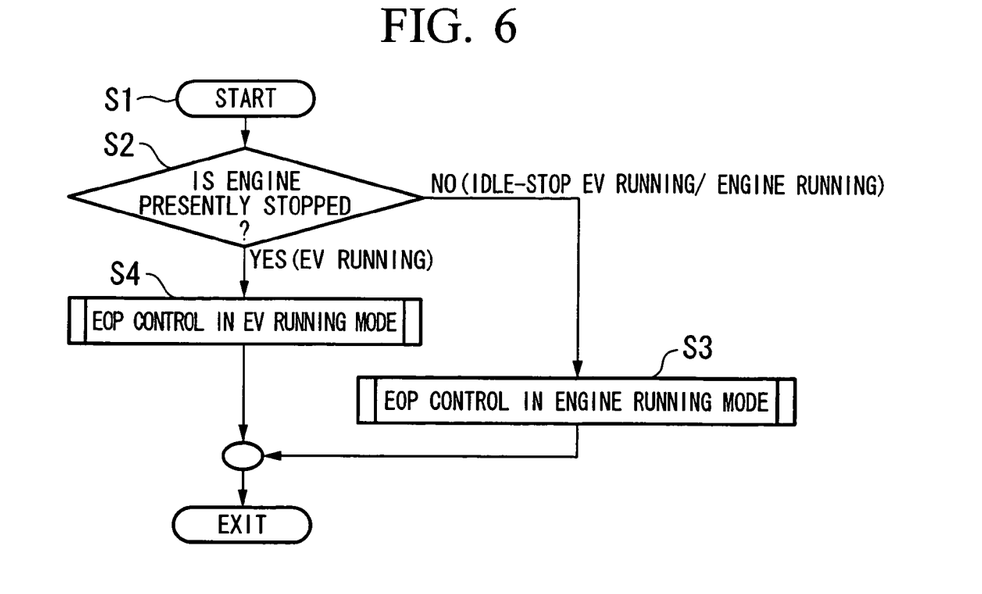
FIG. 6 is a flowchart showing a main control performed in each hybrid vehicle shown in FIGS. 1 to 4.

FIG. 6 is a flowchart showing a main control performed in the hybrid vehicle in the present embodiment. As shown in FIG. 6, when an electric oil pump control is started in step S1, in the next step S2, it is determined whether the engine is presently stopped. If the result of the determination is "YES", the operation proceeds to step S4, and if the result of the determination is "NO", the operation proceeds to step S3. In step S4, an EOP control assigned to the EV running mode is performed, while in step S3, an EOP control assigned to the engine running mode is performed. After step S3 or S4, the operation of the present flow is completed. Below, the controls in step S3 and S4 will be explained with reference to FIGS. 7 and 8.

Figure 7:
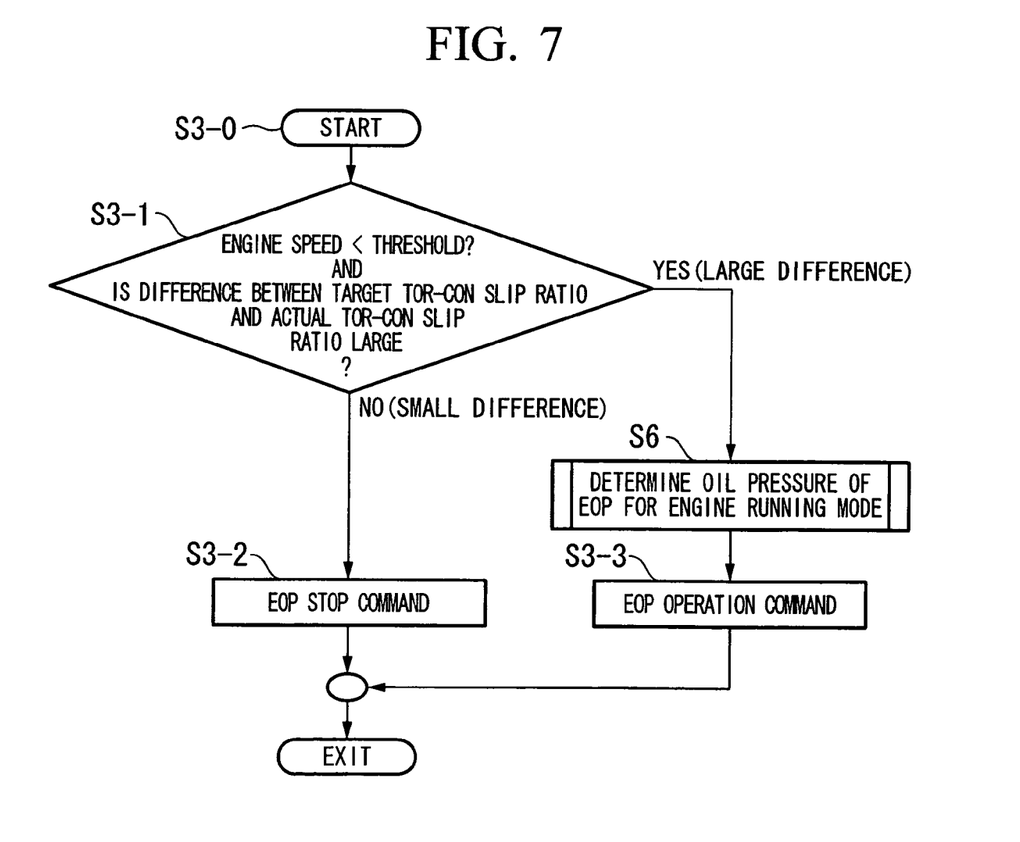
FIG. 7 is a flowchart of an electric oil pump control performed in the engine running mode in each hybrid vehicle shown in FIGS. 1 to 4.

FIG. 7 is a flowchart showing an operation of checking conditions for operating the electric oil pump. In the first step S3-0, an electric oil pump control in the engine running mode is started. In the next step S3-1, it is determined whether the present engine speed is less than a predetermined threshold engine speed and a difference between a target tor-con (torque converter) slip ratio and the actual tor-con slip ratio is large. Here, a tor-con slip ratio indicates a slip ratio of a torque converter. If the result of the determination is "YES", the operation proceeds to step S6, and if the result of the determination is "NO", the operation proceeds to step S3-2.

In step S3-2, a command for stopping the electric oil pump 22 is output. This is because in the relevant situation, starting using the mechanical oil pump 21 is sufficiently possible.

In step S6, an oil pressure of the electric oil pump 22 suitable for the engine running mode is determined. In this determination, a value for reducing the difference between the target tor-con slip ratio and the actual tor-con slip ratio is selected. Accordingly, it is possible to perform a control for obtaining a high regeneration efficiency while preventing a variation in torque at a driving source from being transmitted to the vehicle. In step S3-3, a command for operating the electric oil pump 22 is output, so that quick control is possible when the engine E is driven.

Figure 8:
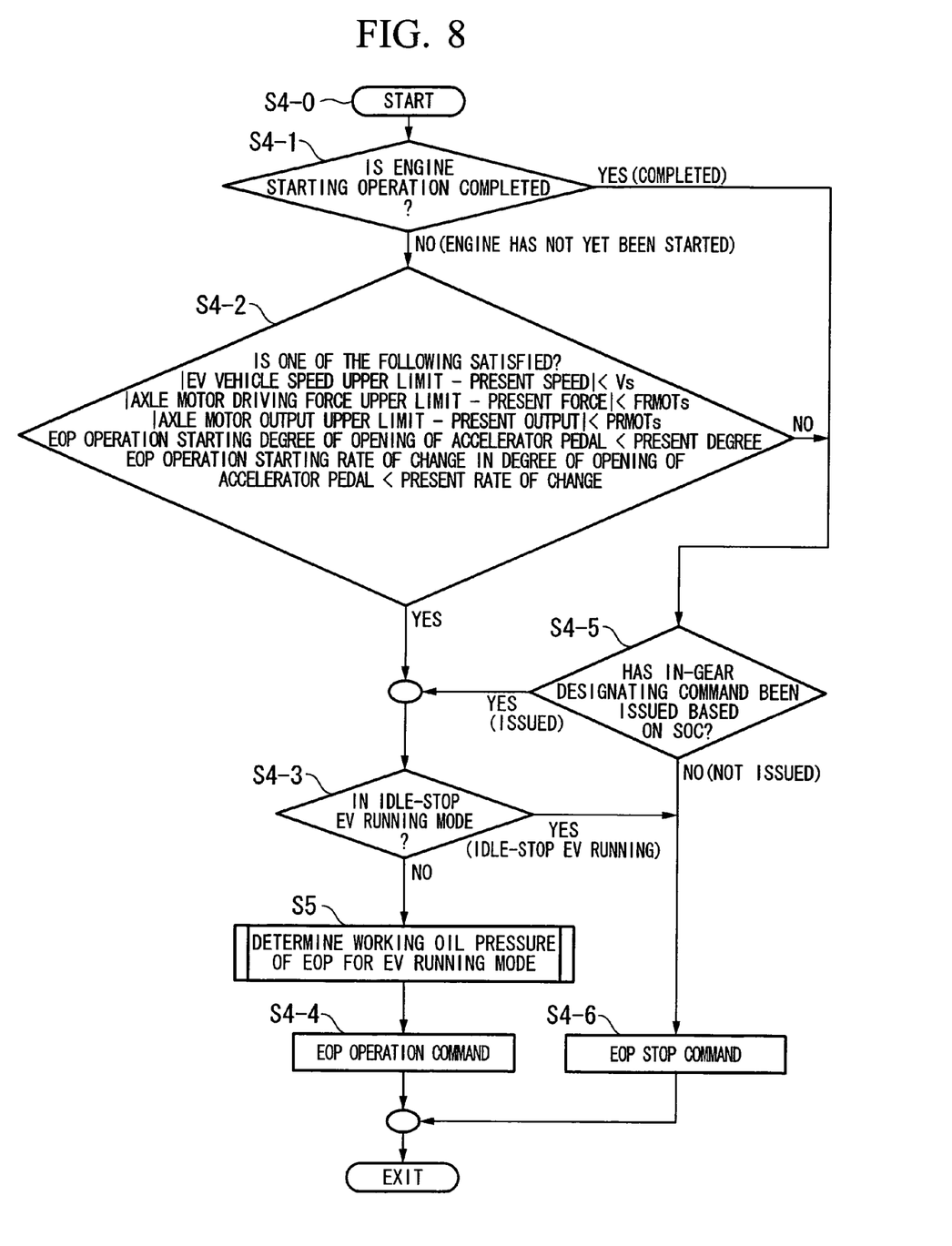
FIG. 8 is a flowchart of an electric oil pump control performed in the EV running mode in each hybrid vehicle shown in FIGS. 1 to 4.

FIG. 8 is a flowchart of an electric oil pump control performed in the EV running mode. When the electric oil pump control in the EV running mode is started in the first step S4-0, the operation proceeds to step S4-1 in which it is determined whether the engine starting operation is completed. If the result of the determination is "YES", the operation proceeds to step S4-5, and if the result of the determination is "NO", the operation proceeds to step S4-2.

In step S4-2, when at least one of the conditions explained below is satisfied, the operation proceeds to step S4-3, and in the other cases, the operation proceeds to step S4-5. The conditions referred to in step S4-2 may relate to the vehicle speed, a driving force of the axle motor, a power output from the axle motor, the degree of opening of the accelerator pedal, and a rate of change in the degree of opening of the accelerator pedal.

Regarding the vehicle speed, it is determined whether a difference between the present vehicle speed and a specific EV upper limit vehicle speed is less than a predetermined threshold Vs.

Regarding the driving force of the axle motor, it is determined whether a difference between the present driving force of the axle motor and an upper limit driving force of the axle motor is less than a predetermined threshold FRMOTs.

Regarding the power output from the axle motor, it is determined whether a difference between the present power output from the axle motor and an upper limit power output from the axle motor is less than a predetermined threshold PRMOTs.

Regarding the degree of opening of the accelerator pedal, it is determined whether the present degree of opening of the accelerator pedal is greater than a predetermined EPO operation starting degree of opening of the accelerator pedal.

Regarding the rate of change in the degree of opening of the accelerator pedal, it is determined whether the present rate of change in the degree of opening of the accelerator pedal is greater than a predetermined EPO operation starting rate of change in the degree of opening of the accelerator pedal.

The above determinations can contribute to improving vehicle driving efficiency and driving performance (i.e., driveability).

In step S4-5, it is determined whether an in-gear designating command based on the amount of power in the battery 7 remaining (i.e., SOC) has been issued. If the result of the determination is "YES", the operation proceeds to step S4-3, and if the result of the determination is "NO", the operation proceeds to step S4-6. In step S4-6, an EOP stop command is output so as not to operate the electric oil pump 22. The fact that the in-gear designating command has been issued indicates that the battery 7 has a specific amount of power remaining or more. Therefore, according to the above control, the electric oil pump 22 can be operated while a certain amount of power remaining in the battery 7 is secured.

In step S4-3, it is determined whether the present running mode is the idle-stop EV running mode. If the result of the determination is "YES", the operation proceeds to step S4-6, and if the result of the determination is "NO", the operation proceeds to step S5. In step S4-6, the EOP stop command is output. In the idle-stop EV running mode, the engine E is rotated by the motor M2 at a predetermined engine speed; thus, the mechanical oil pump 21 can be driven by the engine E. Therefore, when the electric oil pump 22 is stopped in this situation, electric power consumption, fuel consumption, and the vehicle driving efficiency can be improved.

Figure 9:
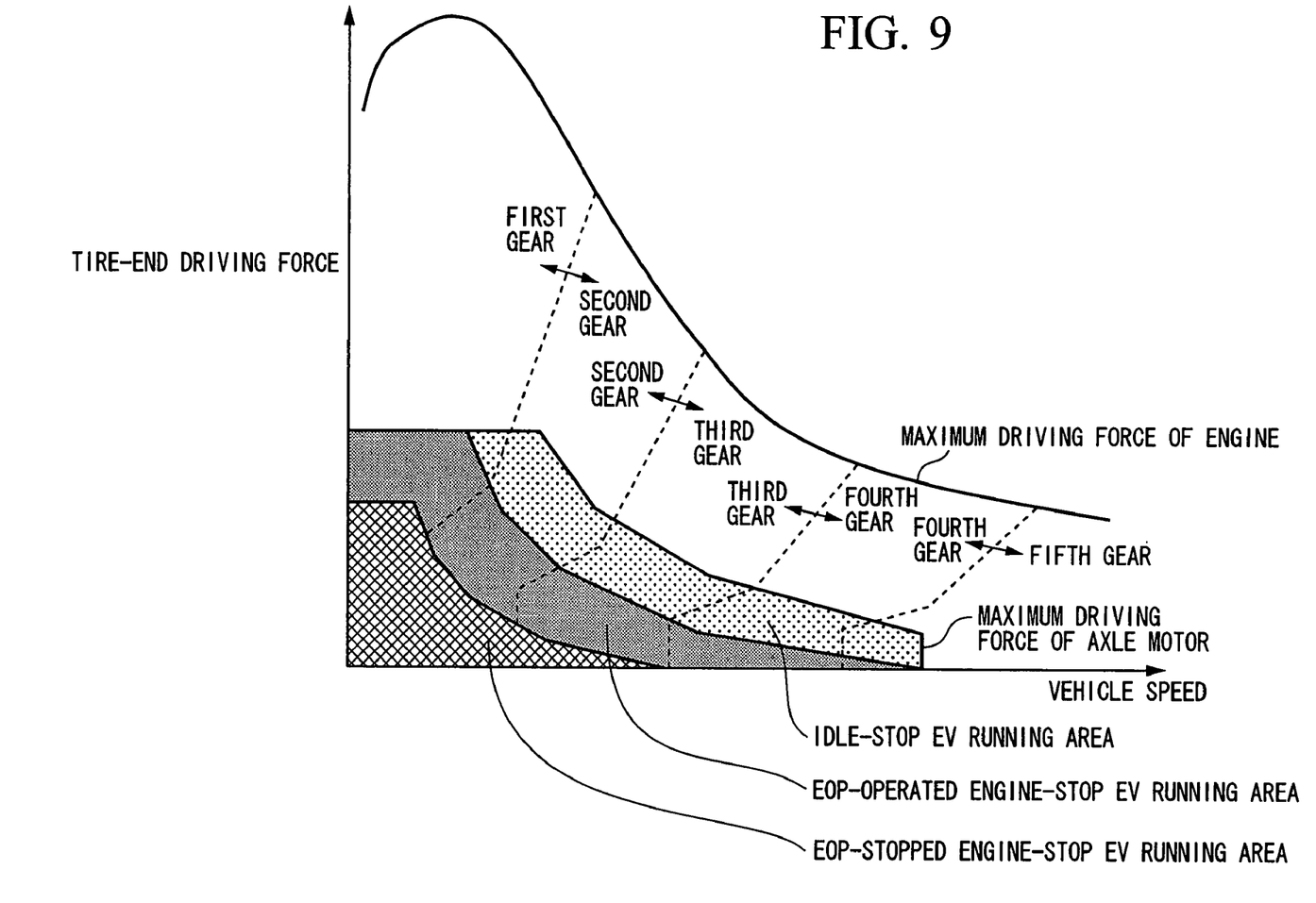
FIG. 9 is a graph showing relationships between the vehicle speed and the tire-end driving force in each running mode in each hybrid vehicle shown in FIGS. 1 to 4.

In step S5, a working oil pressure of the electric oil pump 22 in the EV running mode is determined based on the vehicle speed and a tire-end driving force (i.e., a driving force supplied to the wheels), so as to supply an oil pressure suitable for the shift gear of the transmission T (refer to FIG. 9).

FIG. 9 is a graph showing relationships between the vehicle speed and the tire-end driving force in each running mode. As shown in this graph, an area allocated to a relationship between the vehicle speed and the tire-end driving force for each running mode is defined, and an area allocated to each shift gear is also defined. Based on the above definitions, a working oil pressure most suitable for the present vehicle speed, the present tire-end driving force, and the present shift gear is set.

In the following step S4-4, an EOP operating command for operating the electric oil pump 22 is issued based on the set working pressure.

Figure 10:
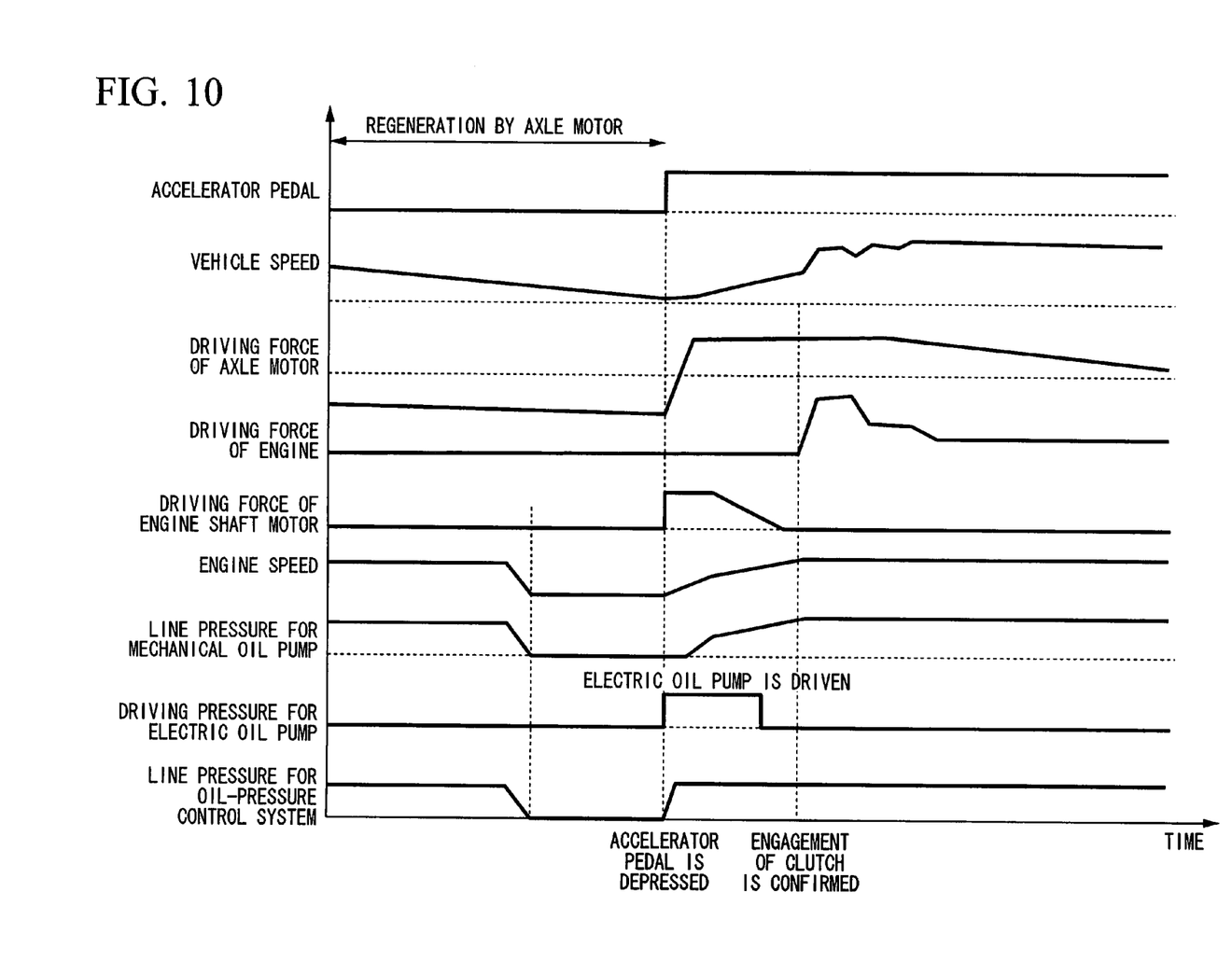
FIG. 10 is a timing chart showing variations in vehicle states when the running mode is switched from the regeneration running mode to the engine running mode in a hybrid vehicle having a structure as shown in FIG. 1.
Figure 11:
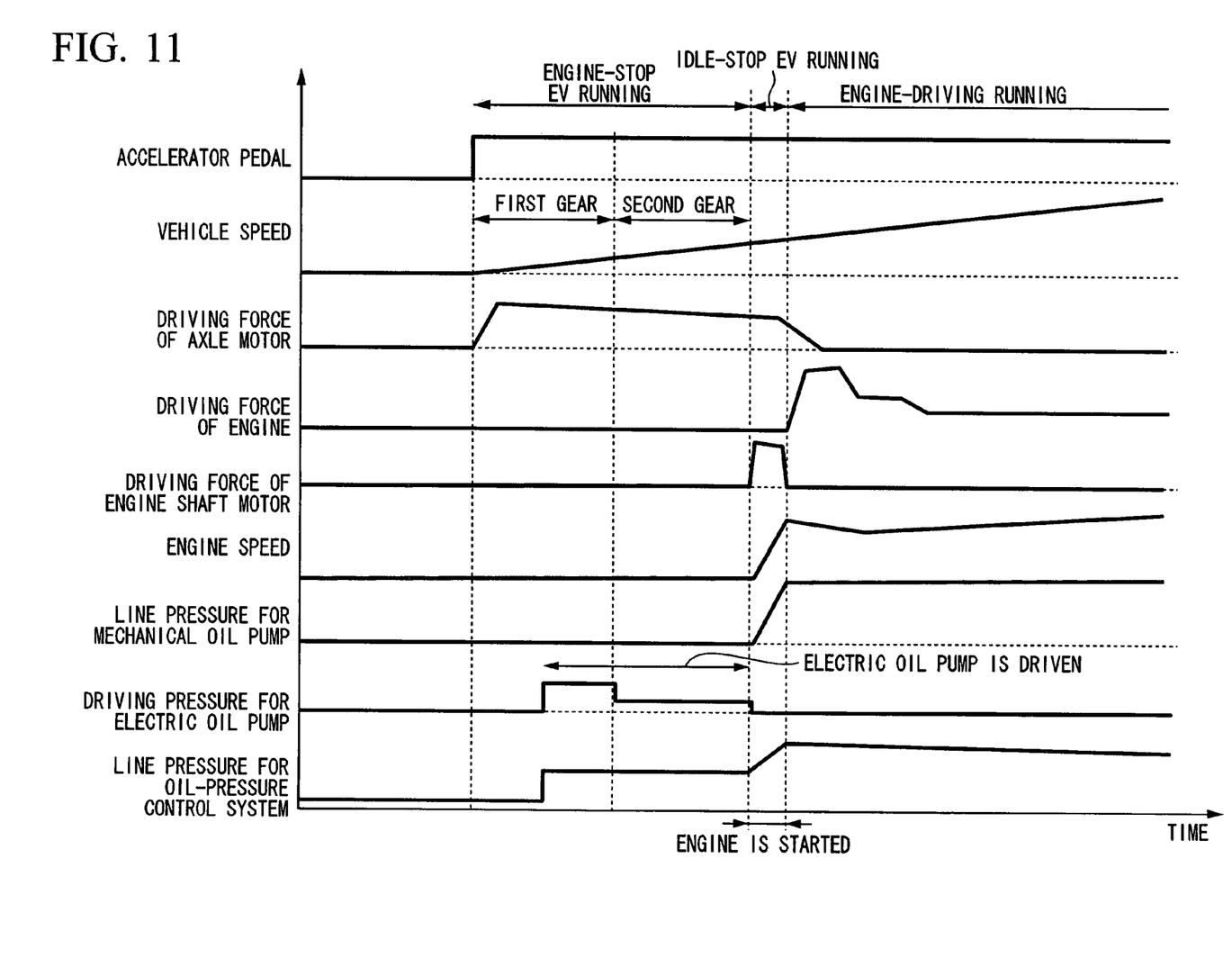
FIG. 11 is a timing chart showing variations in vehicle states when the running mode is switched from the EV running mode to the engine running mode in a hybrid vehicle having a structure as shown in FIG. 1.
Figure 12:
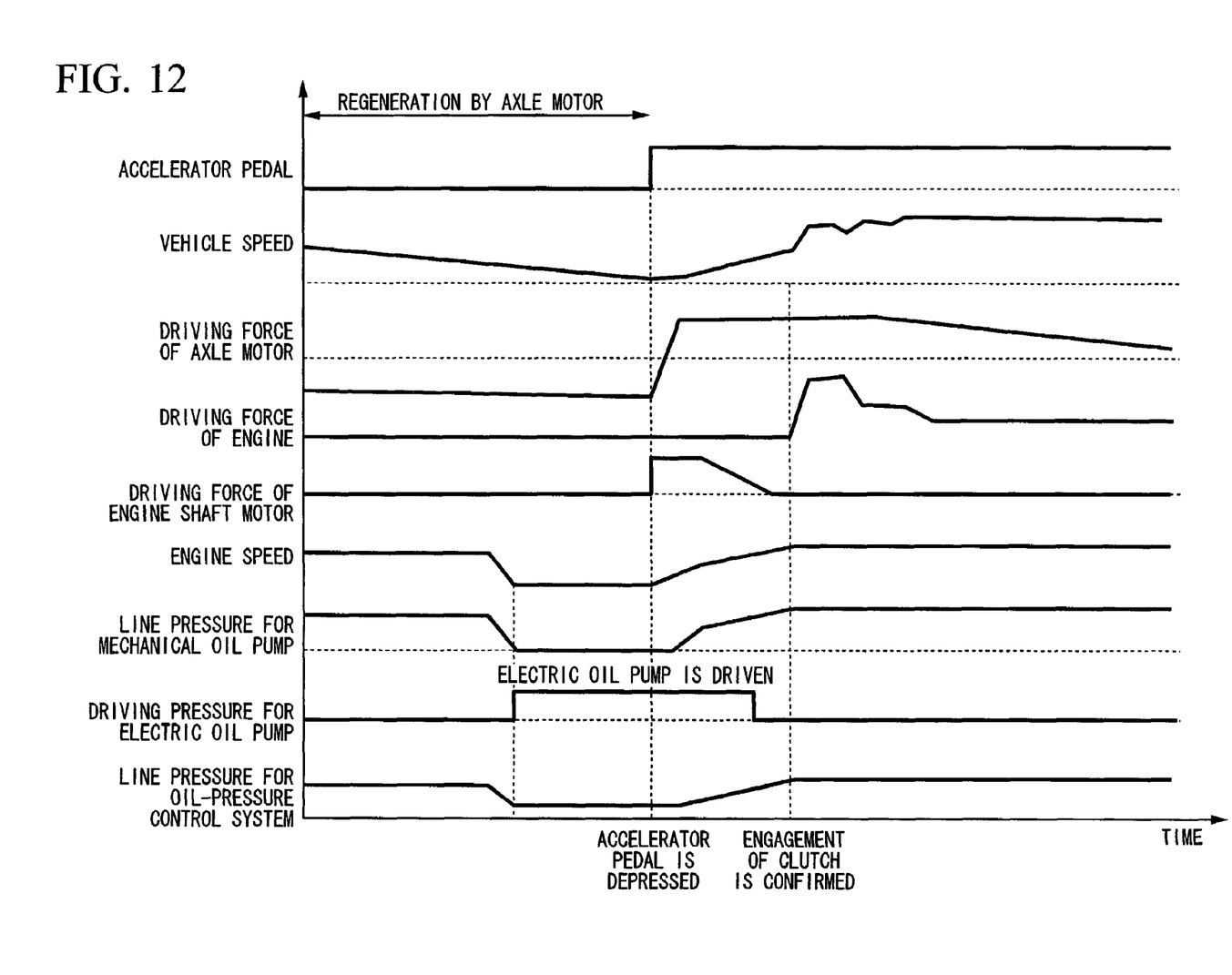
FIG. 12 is a timing chart showing variations in vehicle states when the running mode is switched from the regeneration running mode to the engine running mode in a comparative example.
Figure 13:
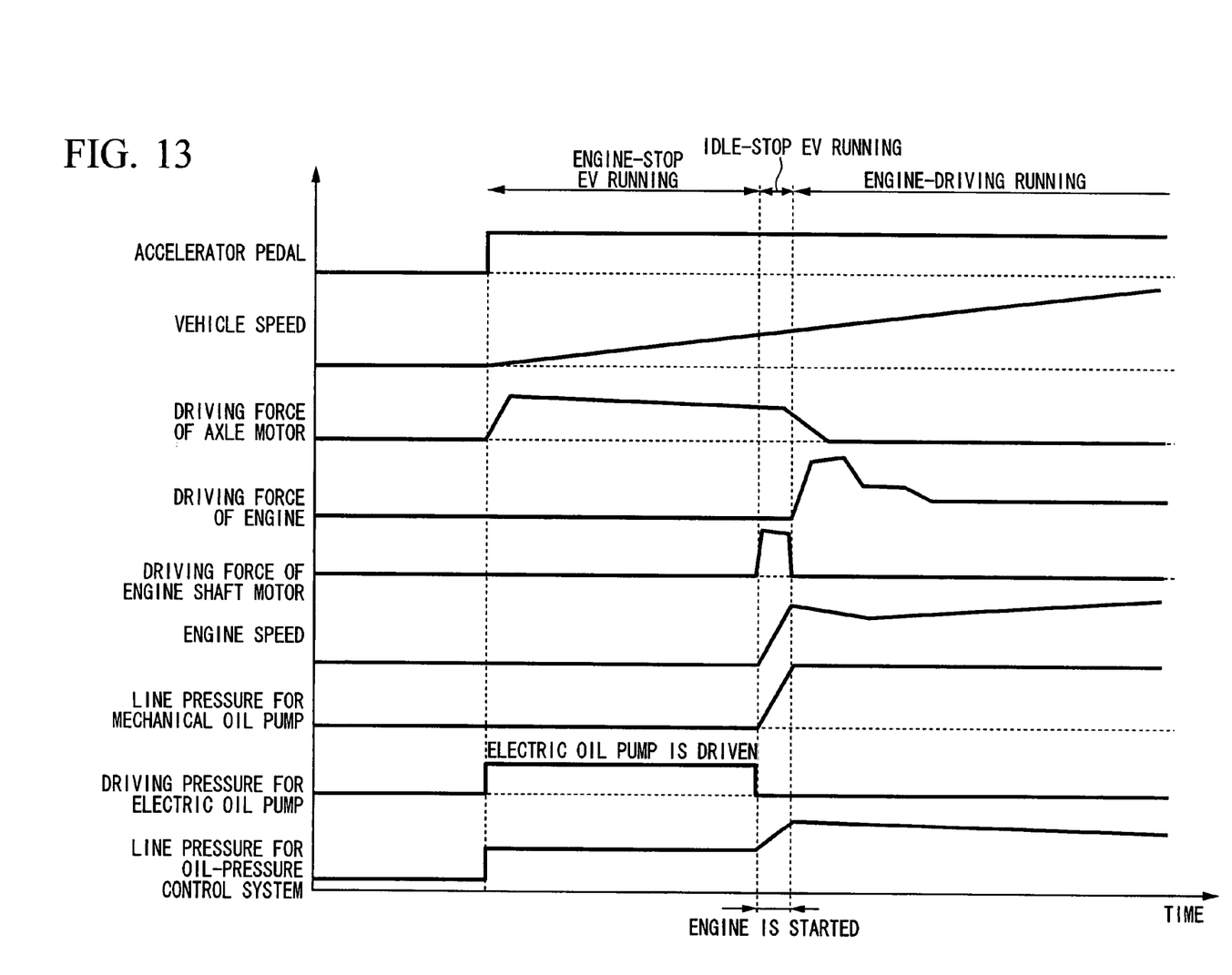
FIG. 13 is a timing chart showing variations in vehicle states when the running mode is switched from the EV running mode to the engine running mode in a comparative example.

FIGS. 10 to 13 are timing charts showing variations in vehicle states when the running mode of the hybrid vehicle is switched from the engine-stop running mode to the engine (i.e., engine-driving) running mode. FIGS. 10 and 11 respectively relate to switching to the engine running mode from a regeneration running mode (FIG. 10) and from the EV running mode (FIG. 11) in a hybrid vehicle having a structure as shown in FIG. 1. FIGS. 12 and 13 respectively show comparative examples corresponding to the cases shown in FIGS. 10 and 11. Specifically, variations in states for the following items are shown: the accelerator pedal (AP), the vehicle speed, the driving force of the axle motor M1 or M3, the driving force of the engine E, the driving force of the engine shaft motor M2, the engine speed, a line pressure for the mechanical oil pump 21, a driving pressure for the electric oil pump 22, and a line pressure for the oil-pressure control system.

First, conventional switching from a regeneration running mode using the axle motor to the engine running mode will be explained with reference to FIG. 12. When the regeneration running using the axle motor is performed, the accelerator pedal is not depressed, and thus the accelerator opening degree sensor is in an off state. Additionally, regeneration operation using the generator motor M2 (i.e., the engine shaft motor) is performed; thus, the motor M2 generates no driving force, and the vehicle speed gradually decreases. In this process, the engine E generates no driving force, and the driving force of the axle motor is negative.

Under this state, when the line pressure of the mechanical oil pump 21 becomes zero, the electric oil pump 22 is driven so as to prepare for starting of the engine E. The electric oil pump 22 is continuously driven until the line pressure of the mechanical oil pump 21 reaches a predetermined value after the accelerator pedal is depressed. Therefore, if the regeneration operation continues for a long time, power consumption or fuel consumption is degraded, and the electric oil pump 22 receives a greater burden.

In contrast, according to the present embodiment as shown in FIG. 10, even when the line pressure of the mechanical oil pump 21 becomes zero, the electric oil pump 22 is not driven by only this condition, and is driven when it is determined that driving of the electric oil pump 22 is necessary (in the present case, when the accelerator pedal is depressed). Therefore, it is possible to prevent unnecessary driving of the electric oil pump 22 and to prevent an increase in power or fuel consumption. It is also possible to reduce the durability required of the electric oil pump, thereby reducing the cost necessary for designing relevant parts. In addition, the running mode can be smoothly switched to the engine running mode; thus, driving performance can be improved.

Next, conventional switching from the engine-stop EV running mode to the engine running mode will be explained with reference to FIG. 13. When the accelerator pedal is depressed and the engine-stop EV running is started, the electric oil pump 22 is driven so as to prepare for starting of the engine E. The electric oil pump 22 is continuously driven until the vehicle speed exceeds a predetermined value under which the engine-stop EV running can be performed. Therefore, if the engine-stop EV running operation continues for a long time, power consumption or fuel consumption is degraded, and the electric oil pump 22 receives a greater burden.

In contrast, according to the present embodiment as shown in FIG. 11, even when the running mode is switched to the engine-stop EV running mode, the electric oil pump 22 is not driven by only this condition, and is driven when it is determined that driving of the electric oil pump 22 is necessary (in this case, when the vehicle speed exceeds a predetermined value). In addition, the driving pressure of the electric oil pump 22 is set to a value necessary for supplying an oil pressure in accordance with a required gear ratio. Therefore, electric running of the hybrid vehicle is possible using less electric power while securing required starting performance of the engine E, thereby contributing to improvement of vehicle driving efficiency.

The oil pressure in accordance with the required gear ratio may be an oil pressure by which an ineffective stroke of engaged elements of the transmission is reduced so that no driving force is transmitted between the hydraulic automatic transmission and the drive wheels.

In addition, driving of the electric oil pump may be controlled in accordance with an oil pressure obtained by adding an oil pressure necessary for lubricating any driving system of the hybrid vehicle to the oil pressure by which the ineffective stroke is reduced.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the automatic transmission may be an AT (step transmission) or a CVT (continuously variable transmission). Additionally, as described above, in a structure having a mechanical oil pump in addition to the electric oil pump, when the mechanical oil pump is operated, the electric oil pump can be stopped; thus, this structure is preferable in consideration of improvement of power or fuel consumption. However, the mechanical oil pump may be omitted.

What is claimed is:

1. An electric oil pump control system for a hybrid vehicle, wherein:
    the hybrid vehicle has:

an engine and a first electric motor as driving sources of the hybrid vehicle;

a hydraulic automatic transmission connected between the engine and drive wheels of the hybrid vehicle;

an electric oil pump for generating an oil pressure necessary for performing gear change of the hydraulic automatic transmission, wherein the hybrid vehicle can run by at least one of the engine and the first electric motor in accordance with a driving state of the vehicle;

the control system has a control device for driving the electric oil pump so as to generate an oil pressure supplied to the hydraulic automatic transmission, wherein the control device drives the electric oil pump when the hybrid vehicle runs with the engine and the electric oil pump which are stopped, in accordance with a predetermined condition by which it is determined that the electric oil pump should be driven; and it is determined that the electric oil pump should be driven when at least one of the following conditions is satisfied as the predetermined condition:

driving force by the first electric motor exceeds a predetermined value;

power output from the first electric motor exceeds a predetermined value;

a rate of temporal change in a degree of depression of an accelerator pedal of the vehicle exceeds a predetermined value; and the degree of depression of the accelerator pedal exceeds a predetermined value.

2. The electric oil pump control system according to claim 1, wherein the engine drives one of front wheels and rear wheels of the vehicle, and the first electric motor drives the other one of the front wheels and the rear wheels.

3. The electric oil pump control system according to claim 1, wherein:

the hybrid vehicle further comprises:

a second electric motor connected to an output shaft of the engine;

a mechanical oil pump driven by the engine; and an engine stop selecting section for selecting one of a first stop state and a second stop state of the engine in accordance with the driving state of the vehicle while the vehicle runs using the first electric motor, wherein in the first stop state, rotation of the engine is mechanically stopped, and in the second stop state, the engine is rotated by the second electric motor at a predetermined engine speed without generating a driving force;

the control device includes an oil pressure control section for controlling the oil pressure supplied from the electric oil pump to the hydraulic automatic transmission, in accordance with the stop state of the engine selected by the engine stop selecting section; and while the vehicle runs using the first electric motor:

when the first stop state is selected by the engine stop selecting section, the electric oil pump is driven if it is required in accordance with the predetermined condition, and when the second stop state is selected by the engine stop selecting section, the electric oil pump is stopped and the oil pressure is generated by the mechanical oil pump.

4. The electric oil pump control system according to claim 3, wherein the oil pressure in accordance with the required gear ratio is an oil pressure by which an ineffective stroke of engaged elements of the hydraulic automatic transmission is reduced so that no driving force is transmitted between the hydraulic automatic transmission and the drive wheels.

5. The electric oil pump control system according to claim 4, wherein driving of the electric oil pump is controlled by the oil pressure control section in accordance with an oil pressure obtained by adding an oil pressure necessary for lubricating another driving system of the hybrid vehicle to the oil pressure by which the ineffective stroke is reduced.

6. The electric oil pump control system according to claim 3, wherein while the first stop state is selected by the engine stop selecting section, in accordance with the driving state of the vehicle, the electric oil pump is driven and controlled by the oil pressure control section so as to supply the oil pressure to the hydraulic automatic transmission in accordance with the required gear ratio.

7. The electric oil pump control system according to claim 3, wherein the predetermined engine speed is an idle engine speed.

* * * * *

UNITED STATES PATENT AND TRADEMARK OFFICE
CERTIFICATE OF CORRECTION

PATENT NO. : 7,617,025 B2  Page 1 of 1
APPLICATION NO. : 11/340470
DATED : November 10, 2009
INVENTOR(S) : Yamamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 840 days.

Signed and Sealed this

Nineteenth Day of October, 2010

David J. Kappos
*Director of the United States Patent and Trademark Office*